W. L. PAUL.
PLOW STRUCTURE.
APPLICATION FILED MAY 28, 1907.
920,990.
Patented May 11, 1909.
2 SHEETS—SHEET 1.
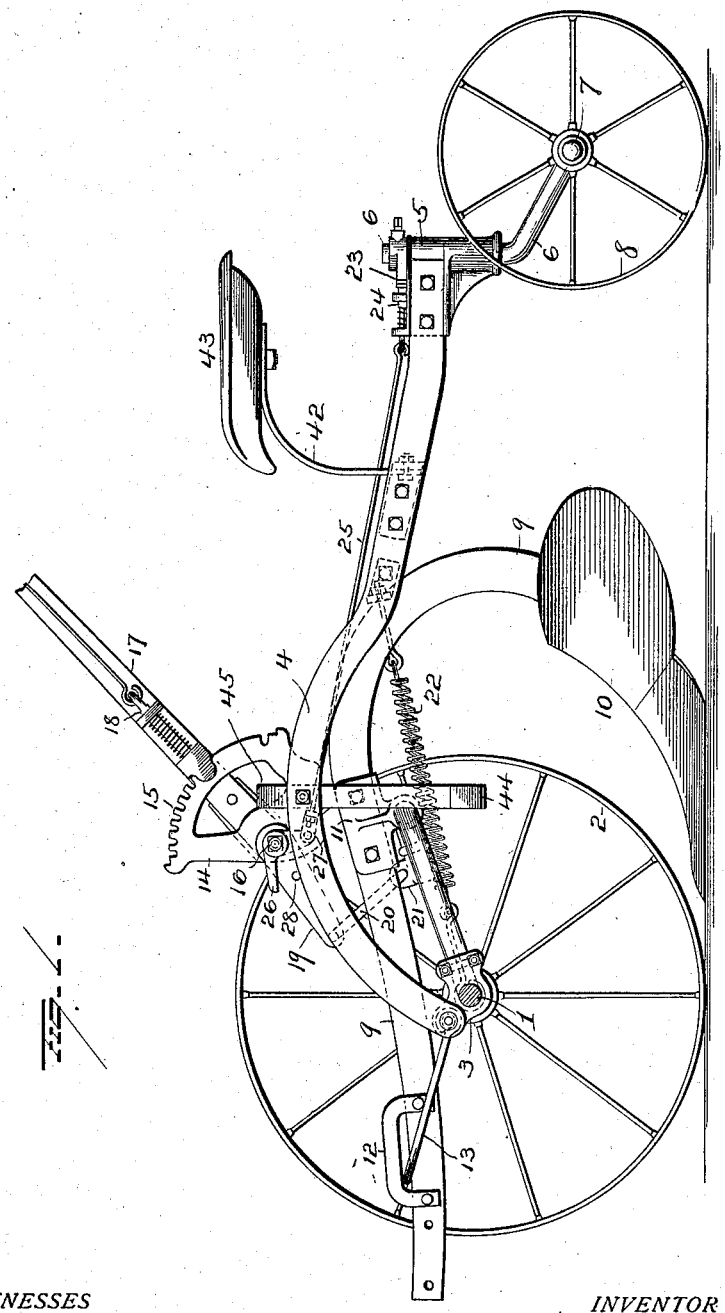
WITNESSES
INVENTOR
W. L. Paul
By H. A. Seymour
Attorney

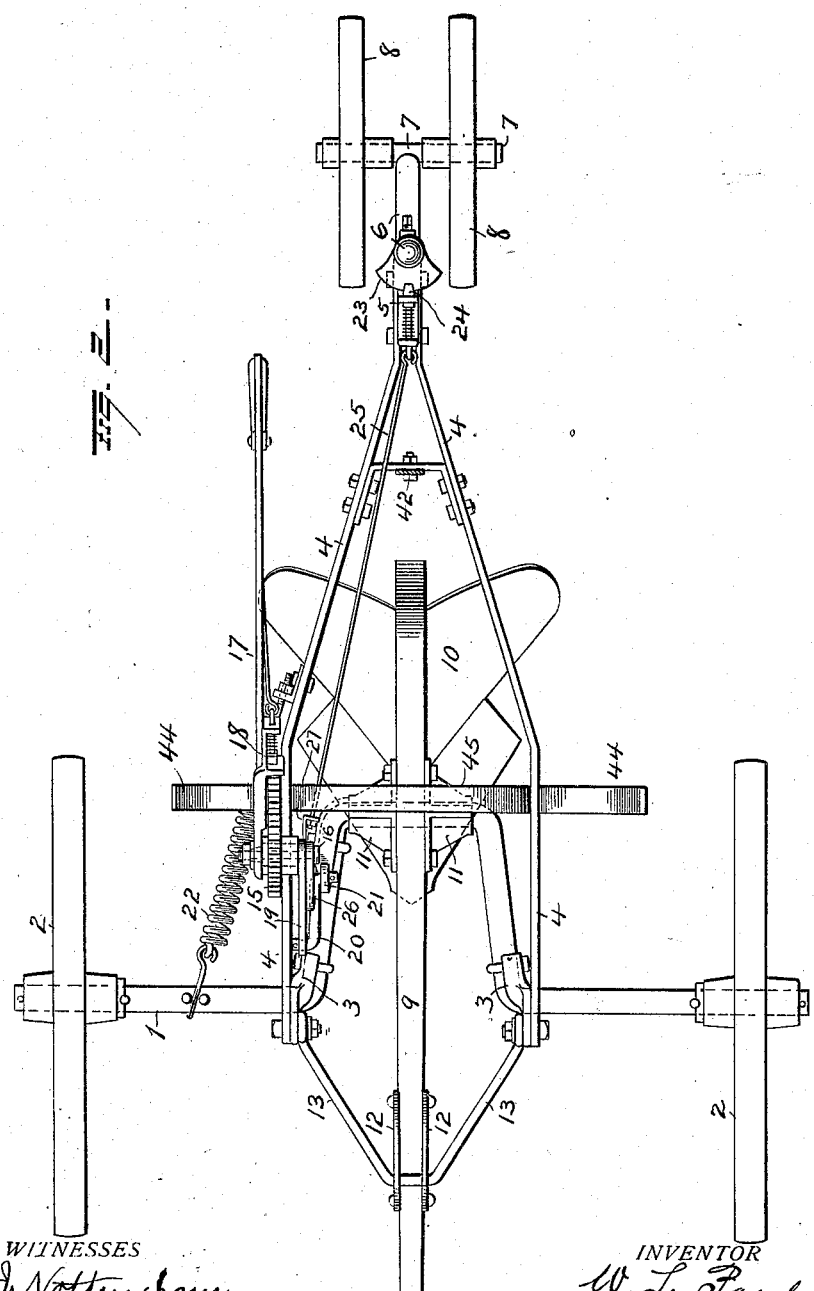

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

PLOW STRUCTURE.

No. 920,990.   Specification of Letters Patent.   Patented May 11, 1909.

Application filed May 28, 1907. Serial No. 376,096.

*To all whom it may concern:*

Be it known that I, WILLIAM L. PAUL, of South Bend, in the county of St. Joseph and State of Indiana, have invented certain new and useful Improvements in Plow Structures; and I do hereby declare the following to be a full, clear, and exact description of the invention, such as will enable others skilled in the art to which it appertains to make and use the same.

My invention relates to a plow structure adaptable for use in the construction of what are commonly known in the art as listers. Heretofore, in machines of this type the frame has been made to extend forwardly to provide a stop for holding down the front end of the beam when the plow is raised, the latter being necessarily pivoted forward of the center of gravity.

One object of my invention is to so build a plow structure that the frame can be made to terminate at the axle; thus permitting of a light and attractive construction, and to provide a forwardly projecting bail which will serve the office of the stop above referred to.

A further object is to provide simple and efficient means whereby a spring can be employed to assist in raising the plow and also in shortening up the machine as the plow is raised.

With these object in view the invention consists in certain novel features of construction and combinations of parts as will hereafter be described and pointed out in the claims.

In the accompanying drawings, Figure 1 is a side elevation, partly in section, of a machine embodying my improvements. Fig. 2 is a plan view of the same.

1 represents an arch-axle mounted at its respective ends within the hubs of carrying-wheels 2. At the juncture of the U-shaped intermediate portion with the horizontal portions of the arch-axle, brackets 3 are attached, and to these brackets the respective members of the machine frame 4 are pivotally connected. The frame 4 is of general V-shape and at the rear meeting ends of its members a bracket 5 is secured to afford a bearing for the vertical upper portion of an axle 6, the lower portion of said axle being bent rearwardly and provided at its lower end with laterally projecting inclined journals 7 for the accommodation of two caster or follower-wheels 8.

9 represents a plow beam having plow 10 secured thereto and said beam has secured thereto journal boxes 11 for the accommodation of the arch-axle. The beam 9 is also provided at its forward portion with loops 12 which are bolted thereto and which receive the forward, intermediate portion of a bail 13, the rear ends of which are connected with the brackets 3 on the arch-axle.

As before stated the frames of planters of the type to which my invention relates have been made to extend forward to provide a stop to hold down the front end of the beam when the plow is raised, thus necessitating the pivoting of the plow forwardly of the center of gravity. Such construction is avoided in my machine and the bail 13 is made to serve the purpose of such a stop and furthermore I am enabled to shorten the machine by terminating the frame at the axle.

Bracket 14, secured to the frame 4, is provided with a toothed-segment 15 and affords a bearing for the pivot pin 16 of a lever 17, said lever being provided with a latch 18 to engage the toothed-segment 15. An arm 19 is secured to the pivot pin 16 and is connected, by means of a link 20, with a bracket 21 secured to the arch-axle. It is apparent that by the operation of this lever the plow beam and the plow carried thereby can be raised and lowered. To assist in the raising of the plow a spring 22 may be employed. One end of this spring is connected with the frame 4 and the other end with the arch-axle.

The upper end of the axle 6 on which the follower-wheels 8 are mounted, is provided with a notched-segment 23 and with this segment a latch 24 mounted on the frame 4, is adapted to engage to retain the follower-wheels in their normal position. A rod 25 is attached at its rear end to the latch 24 and connected at its forward end with a bell-crank lever 26 through the medium of a link 27, said bell-crank lever being attached to the pivot pin 16 of the lever 17. By means of this construction, when the lever 17 is operated to raise the plow, one arm of the bell-crank lever 26 will be engaged by the lug 28 on the arm 19 and operate, through the medium of the rod 25 to withdraw the latch 24 and release the axle 6, thus permitting the latter to turn.

Supports 42 are secured to the frame 4 for the accommodation of a seat 43 and foot-rests 44 are provided at the depending ends of a yoke 45 secured to said frame.

The details of construction may be varied without departing from the scope of my invention and hence I do not wish to be restricted to the precise constructive details herein set forth.

Having fully described my invention what I claim as new and desire to secure by Letters-Patent, is—

1. The combination with an arch-axle and wheels, of brackets attached to said arch-axle, a frame pivoted at its forward end to said brackets, a plow-beam connected with the arch-axle, and means mounted on the frame and connected with said arch-axle for raising and lowering the beam.

2. The combination with an arch-axle and carrying-wheels, of a frame connected at its forward end with said axle, means for supporting the rear end of the frame, a plow-beam connected with the arch-axle, a bracket attached to the arch-axle, and means mounted on the frame and connected with said bracket for raising and lowering the plow.

3. The combination with an arch-axle and carrying wheels, of a frame connected at its forward end with the arch-axle, a plow-beam connected with the arch-axle, a loop on the forward portion of the plow-beam, a bail connected with the forward end of the frame and engaging said loop, and means for supporting the rear end of said frame.

4. The combination with an arch-axle and carrying wheels, of a plow beam connected with the U-shaped portion of the arch-axle, brackets attached to the alining portions of said arch-axle, a loop secured to the forward portion of the beam, a bail connected with said brackets and engaging said loop, a frame connected at its forward end with said brackets, and means for supporting the rear end of said frame.

5. The combination with an arch-axle, carrying wheels, and a plow-beam connected with said arch-axle, of a frame connected at its forward end with the arch-axle, means mounted on the frame and connected with the arch-axle for raising and lowering the plow, a spring attached at one end to the arch-axle and at the other end to the frame for assisting in raising the plow, and means for supporting the rear end of the frame.

6. The combination with an arch-axle and carrying wheels, of a frame supported at its forward end by the arch-axle, a plow-beam connected with the arch-axle, a lever mounted on the frame and connected with the arch-axle for raising and lowering the plow, a bracket secured to the rear end of the frame, an axle having a mounting in said bracket, follower-wheels on said axle, a notched-arm secured to the upper end of said axle, a latch mounted on the frame and engaging said notched-arm, bell-crank lever, a connection between said bell-crank lever and said latch, and means operated by the first mentioned lever to engage the bell-crank lever and move said latch to release the axle at the rear end of the same when said first mentioned lever is operated to raise the plow.

7. The combination with an arch-axle and carrying wheels, of a frame comprising two members secured together at their rear ends and connected at their forward ends with the arch-axle at respective sides of the U-shaped intermediate portion thereof, a plow beam connected with the arch-axle, a bail connected with the forward end of said frame and having a sliding connection with the forward portion of the plow beam, and means mounted on the frame and connected with the arch-axle for raising and lowering the plow.

In testimony whereof, I have signed this specification in the presence of two subscribing witnesses.

WILLIAM L. PAUL.

Witnesses:
FRANCIS C. NIPPOLD,
W. A. WEED.